(12) United States Patent
Sicard

(10) Patent No.: US 12,306,654 B2
(45) Date of Patent: May 20, 2025

(54) CURRENT REFERENCE CIRCUIT

(71) Applicant: NXP USA, Inc., Austin, TX (US)

(72) Inventor: Thierry Michel Alain Sicard, Auzeville Tolosane (FR)

(73) Assignee: NXP USA, Inc., Austin, TX (US)

( * ) Notice: Subject to any disclaimer, the term of this patent is extended or adjusted under 35 U.S.C. 154(b) by 231 days.

(21) Appl. No.: 18/046,956

(22) Filed: Oct. 17, 2022

(65) Prior Publication Data
US 2023/0152835 A1 May 18, 2023

(30) Foreign Application Priority Data
Nov. 15, 2021 (EP) ...................... 21306585

(51) Int. Cl.
*G05F 3/22* (2006.01)

(52) U.S. Cl.
CPC .............. *G05F 3/225* (2013.01); *G05F 3/227* (2013.01)

(58) Field of Classification Search
CPC .................................. G05F 3/225; G05F 3/227
See application file for complete search history.

(56) References Cited

U.S. PATENT DOCUMENTS

| | | | |
|---|---|---|---|
| 4,528,495 A | 7/1985 | Dorsman | |
| 7,276,890 B1 | 10/2007 | Kumar | |
| 7,482,857 B2 | 1/2009 | Song | |
| 11,262,781 B2 * | 3/2022 | Sicard | G05F 3/265 |
| 11,714,447 B2 * | 8/2023 | Sicard | G05F 1/46 |
| | | | 323/313 |
| 2005/0093530 A1 * | 5/2005 | Lee | G05F 3/245 |
| | | | 323/315 |
| 2009/0058390 A1 | 3/2009 | Irmscher | |
| 2020/0301462 A1 | 9/2020 | Sicard | |

FOREIGN PATENT DOCUMENTS

EP 3712739 A1 9/2020

* cited by examiner

*Primary Examiner* — Adolf D Berhane

(57) ABSTRACT

A current reference circuit, comprises a main resistor, comprising: a first force contact terminal at a first end of the main resistor and coupled to a first metal-oxide-semiconductor (MOS) component; a second force contact terminal at a second end of the main resistor and coupled to a second MOS component; a first sense contact terminal coupled to one bipolar junction transistor (BJT); and a second sense contact terminal opposite the first sense contact by a length of the main resistor and coupled to another bipolar junction transistor, wherein the first and second sense contact terminals exchange a current reference independently of the first and second force contact terminals.

20 Claims, 6 Drawing Sheets

CURRENT REFERENCE CIRCUIT

CROSS-REFERENCE TO RELATED APPLICATIONS

This application claims the priority under 35 U.S.C. § 119 of European Patent application no. 21306585.7, filed on 15 Nov. 2021, the contents of which are incorporated by reference herein.

FIELD

The present disclosure relates generally to a current reference circuit, and more specifically, to a circuit that generates a current reference that is unaffected by the contacts of a poly resistor.

BACKGROUND

Reference generators are implemented in a variety of integrated circuits useful in a wide range of electronic applications that require accurate signal processing.

Conventional reference generators may experience a "resistor contact effect" where deterioration of the contacts of a polysilicon resistor, or "poly resistor" can have an effect on the DC current drawn from sensor terminals on either side of the poly resistor. This may cause variations in the relative resistance of the resistor. The contact effect can degrade the performance of the voltage bandgap across the main resistor and result in undesirable lifetime drift of the bandgap and 1/f noise to occur.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In brief overview, embodiments of the present disclosure describe a current reference circuit that is insensitive to poor poly resistor contacts. The current reference circuit has three resistors: two of which provide a resistor ratio and one for a main reference current, each having four contacts, referred to as Kelvin contacts, to which force and sense measurements are applied. The resistor sense voltage, or Kelvin contact, allows the circuit to be immune from a poor poly resistance contact effect, which reduces or eliminates 1/f noise, lifetime drift, and contact resistance variations during circuit test and package stress operations.

In some embodiments, a sense circuit is provided on each side of the resistor to provide a fine or course trim control to increase trim accuracy to +/−0.2% and cover a correction of +/−25% of the initial current value. The trim is simplified by using both current resistance sensors to produce a fine or course trim but moving the sense position over the main current resistance.

Figure 1:
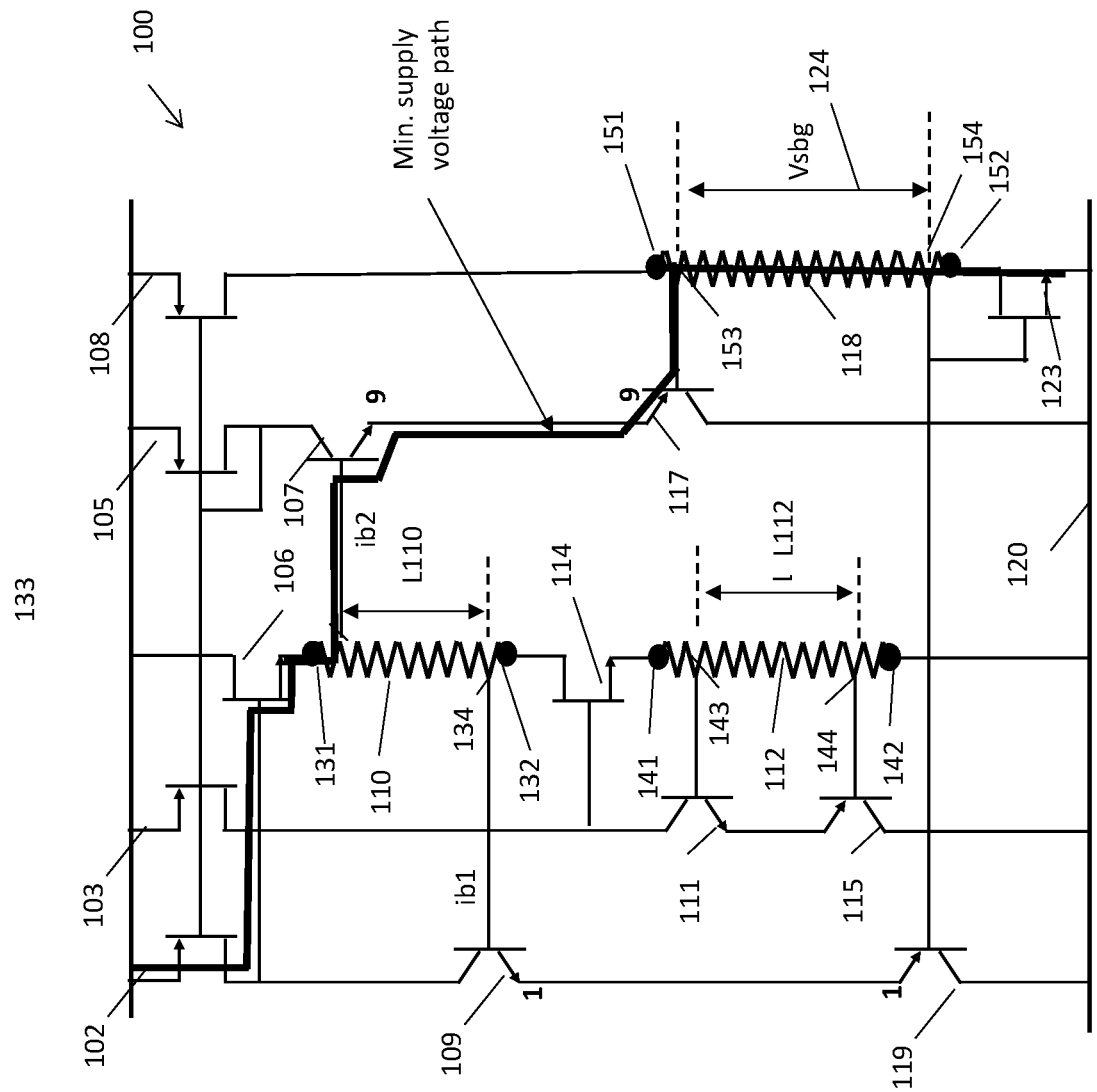
FIG. 1 is a schematic representation of a current reference circuit, in accordance with an embodiment.

FIG. 1 is a schematic representation of a current reference circuit 100, in accordance with some embodiments. The current reference circuit 100 can be implemented in various electronic applications including, but by no means limited to, automotive, industrial, and consumer applications including signal processing or battery management system (BMS) applications. One application includes the implementation of a computer chip or related integrated circuit. Other applications may equally apply, which require accuracy with respect to a current reference, where the circuits of the application include a current bias block due to the current reference circuit 100 reducing effects caused by lifetime drift and 1/f noise, in particular, removing the Rpoly contact effect. The integrator can be implemented in various electronic applications including, but by no means limited to, automotive, industrial, and consumer applications.

As shown in FIG. 1, in one or more embodiments the current reference circuit 100 comprises a plurality of poly resistors 110, 112, and 118, a plurality of Metal-Oxide-Semiconductor Field-Effect Transistors (MOSFETs) and a plurality of bipolar junction transistors (BJTs). The MOSFETs, referred to source transistors, may include but not be limited to a first PMOS transistor 102, a second PMOS transistor 103, a third PMOS transistor 105, a fourth PMOS transistor 108, a first n-channel (NMOS) transistor 106, a second NMOS transistor 114, and a third NMOS transistor 123, referred to as MOS components. The BJTs may include a first BJT 107, a second BJT 109, a third BJT 111, a fourth BJT 115, a fifth BJT 117, and a sixth BJT 119 coupled to the sense contacts of the poly resistors 110, 112, 118, respectively. In some embodiments, the first, second, and third BJTs 107, 109, 111 are n-type transistors and the fourth through sixth BJTs 115, 117, 119 are p-type transistors.

Each poly resistor 110, 112, and 118 applies a four terminal Kelvin configuration, or more specifically, a topology that includes both force and sense contacts at both sides of the poly resistor, described below for example with respect to FIG. 3. Unlike conventional reference circuits, the poly resistors 110, 112, 118 of the current reference circuit 100 are not sensitive to resistor contact variations at the force contacts, which provide the current for the poly resistors. The first poly resistor 110 has a first force contact 131 coupled to a source of the NMOS transistor 106 and a second force contact 132 coupled to a drain of the second NMOS transistor 114. The first poly resistor 110 also has a first sense contact 133 and a second sense contact 134 arranged at different positions along a length of the first poly resistor 110 between the first and second force contacts 131, 132. During operation, in order to sense the electrical impedance at the poly resistors in the absence of a contact effect, a low current is required, e.g., a base current on both sides of the resistor. Since the sense current is very small, the resistance contact has little or no effect on the sense contact as compared to the resistance contact on both sides of the main current reference resistor 118. Here, bipolar junction transistors (BJTs) are coupled to the sense contacts of the resistors 110, 112, 118, respectively. The base of the first BJT 107 is coupled to the first sense contact 133 and the base of a second BJT 109 is coupled to the second sense contact 134. The second poly resistor 112 has a first force contact 141 in electronic communication with a source of the NMOS transistor 114 and a second force contact 142 in electronic communication with a ground 120.

The second poly resistor 112 also has a first sense contact 143 and a second sense contact 144 arranged at different positions along a length of the second poly resistor 112 between the first and second force contacts 141, 142. The base of the third BJT 111 is coupled to the first sense contact 143 and the base of a fourth BJT 115 is coupled to the second sense contact 144.

The first poly resistor 110 has a value (r) and the second poly resistor 112 has a value (R). A ratio of the first resistance and the second resistance (r/R) can establish the sub-bandgap voltage (Vsbg) across the third poly resistor 118, also referred to as a main current reference resistor or main poly resistor, and control the current is controlled by a closed loop formed in concert with the second NMOS transistor 114. More specifically, the resistance ratio r/R (around 0.1) multiplied by the sum of voltage (Vbe) of the third BJT 111+voltage (Vbe) of the fourth BJT 115 gives the voltage across r, which for example is approximately (600 m+600 m)*0.1=120 mV. The voltage Vsbg across the main resistor 118 is the sum of this voltage (e.g., 120 mV) across the first poly resistor (r) 110. The ΔVbe value is determined to be the voltage (Vbe) of the sixth BJT 119 (119) plus the voltage (Vbe) of the second BJT 109 minus the voltage (Vbe) of the first BJT 107 minus the voltage (Vbe) of the fifth BJT 117.

Another feature is that the operation of the circuit 100 is unaffected by the contact effect due to this arrangement of poly resistors and contact communication with the various transistors, namely, combinations of BJTs and MOSFETs, of the circuit 100.

The main current reference resistor 118 has a first force contact 151 in electronic communication with the drain of the fourth PMOS transistor 108 and a second force contact 152 in electronic communication with the drain of the sixth BJT 119. The main current reference resistor 118 also has a first sense contact 153 and a second sense contact 154 arranged at different positions along a length of the main current reference resistor 118 between the first and second force contacts 151, 152. The base of the fifth BJT 117 is coupled to the first sense contact 153 and the base of the sixth BJT 119 is coupled to the second sense contact 154.

As described above, the second NMOS transistor 114 coupled between the first resistor 110 and the second resistor 112 can form a closed loop so that the loop current is equal to (V(115)+V(111)/R, where V(115) is the voltage at the fourth BJT 115, V(111) is the voltage at the third BJT 111, and R is the resistance value of the second poly resistor 112. This loop current is therefore provided to the first poly resistor 110. The first NMOS transistor 106 closes the loop so that the current across the first NMOS transistor 106 is equal to the current across the second NMOS transistor 114.

In comparison, a conventional circuit may have a sub-bandgap voltage across its main resistor of 120 mV. However, as described herein, this conventional circuit is susceptible to the poly resistor contact effect with respect to lifetime drift and noise. The resistance ratio of the circuit in the embodiment illustrated FIG. 1, however, does not depend on the resistor contacts. Since the bandgap uses both a NPN transistor, e.g., NPN transistor 111 and/or 107 and PNP transistor 117 and/or 115, the sub-bandgap voltage (Vsbg) across the resistor 118 is 240 mV instead of 120 mV.

In addition, by adjusting the sense positions, for example, at locations 153 and 154 across the resistor 118, the output current can be adjusted if the bandgap is used for a current source generator.

In some embodiments, as shown in FIG. 1, a minimum supply voltage path is formed during operation from the first PMOS transistor 102 to the third NMOS transistor 123 via the first NMOS transistor 106, BJTs 107, 117, and main resistor 118. This path establishes a minimum operating voltage for applications requiring a supply voltage of 3V or more.

As also shown in FIG. 1, it is preferable that the current through the first poly resistor 110 and the second poly resistor 112 is the same. The base current (ib1) of the second BJT 109 flowing through the first poly resistor 110 creates an offset voltage equal to r*ib1, wherein r is the resistance valve of the first poly resistor 110. This offset voltage does not extend across the second resistor 112. To compensate for this, the base current (ib2) at the base of the first BJT 107 and the second BJT 109 is the same because they have the same collector current. In some embodiments, a resistor (not shown) is at the base of the first BJT to create the same voltage offset (Voff) equal to r*ib. As the beta value decreases when temperature decreases, it is important to compensate for the base current error. The voltage across the resistor at the base of the first BJT 107 is Vbe2*r/R+Voff, wherein R is the resistance value of the second poly resistor 112 and Vbe2 is the sum of the Vbe voltage of the fourth BJT 115 and the Vbe voltage of the third BJT 111 coupled to the sense contacts 143 and 144, respectively, of the second poly resistor 112. However, the same offset is removed at the base of the first BJT 107, so that voltage between the bases of the first BJT 107 and the second BJT 109 is:

$$Vbe2*r/R+Voff-Voff=Vbe2*r/R.$$

Here, −Voff=−r(Ib2), where r is the resistance (not shown) and Ib2 is the current at the base circuit of the first BJT 107.

Figures 2, 3:
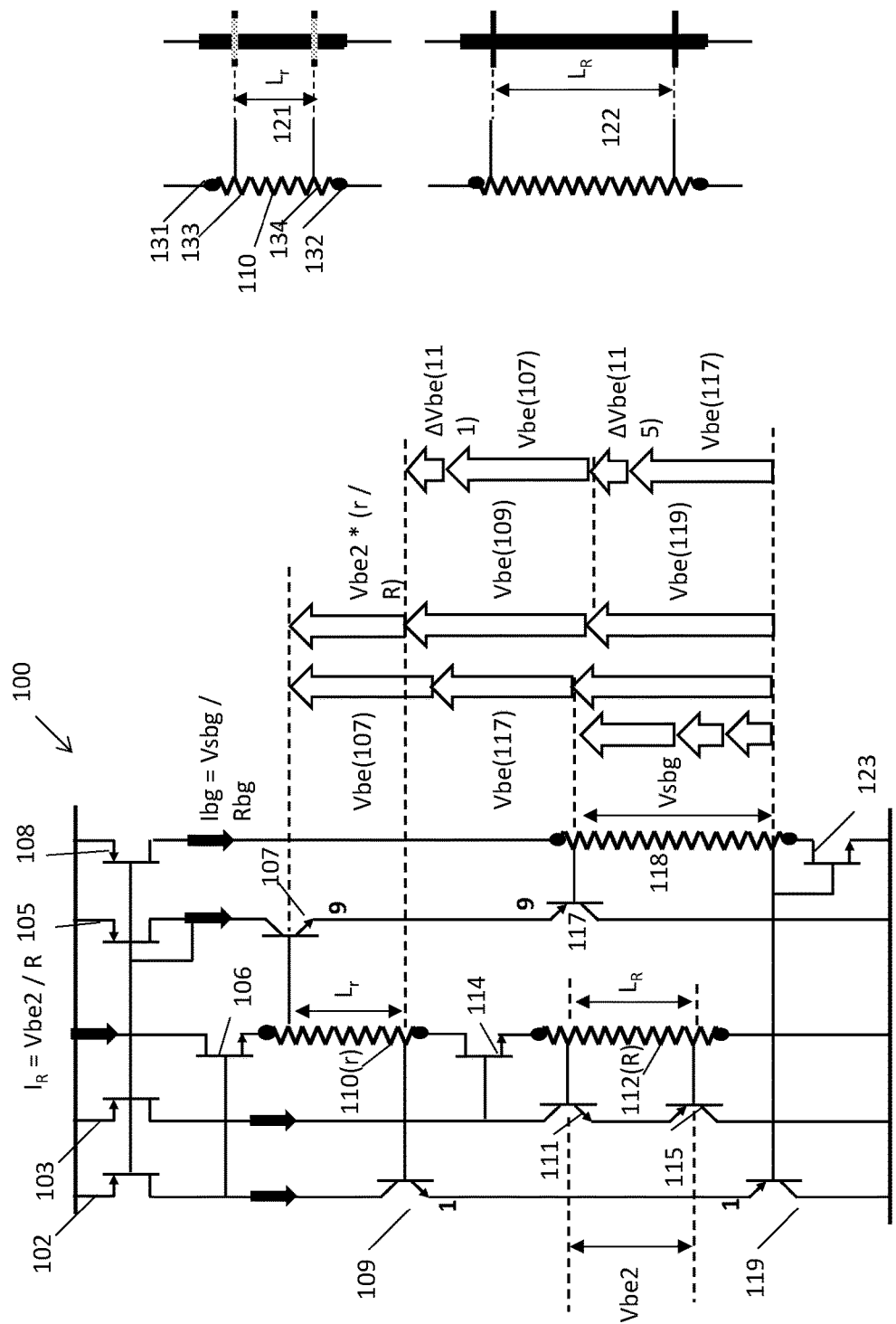
FIG. 2 is a detailed schematic representation of the current reference circuit of FIG. 1.
FIG. 3 is a schematic representation of the resistor layout and topology of the current reference circuit of FIGS. 1 and 2.

FIG. 2 is a more detailed schematic representation of the current reference circuit 100 of FIG. 1. As shown in FIG. 2, the bandgap current (Ibg) of the main current reference resistor 118 is calculated according to equation (1):

$$Ibg=Vsbg/Rbg \qquad (1)$$

where the resistance value (Rbg) of the main current reference resistor 118 is defined by the length of the resistor 118 between the sense contacts 153, 154. The current (Ibg) is applied to all BJTs 107, 109, 111, 115, 117, and 119 coupled to the sense contacts of the poly resistors 110, 112, 118, respectively. For example, as shown in FIG. 2, the current (Ibg) is at the drain of the fourth PMOS transistor 108 for input to the main poly resistor 118.

The current ($I_R$) is determined to be the sum of the base-emitter voltage ($V_{be}$) of the third BJT 111 and the $V_{be}$ of the fourth BJT 115 (or Vbe2) divided by R, where R is defined as the length $L_R$ (112) of the second poly resistor 112 between sense contacts 143, 144, or:

$$I_R=Vbe2/R \qquad (2)$$

The base-collector voltage ($V_{bc}$) of the fourth BJT 115 is at or near 0V. The current ($I_R$) is controlled by the closed loop formed at least in part by the second NMOS transistor 114, which transmits the current ($I_R$) in the first poly resistor 110 defined by the length $L_r$ (121) of the first poly resistor 110 between sense contacts 133, 134. In this embodiment, the first and second poly resistors 110, 112 have the same body width, for example, shown in FIG. 3. As described above, a feature of the current reference circuit 100 is that in the resistance ratio (r/R) the resistor 112 must be sensed with both the NPN transistor 111 and the PNP transistor 115. Since the ratio (r/R) does not depend on resistor contact, the length ratio is given by the sense contact positions ($L_r$ and $L_R$, respectively). The voltage between the base of the first BJT 107 and the base of the second BJT 109 across the first poly resistor 110 is calculated as: Vbe2*(r/R). This voltage is proportional to a Vbe voltage across the first BJT 107.

As described above, the base of the fourth BJT 119 is coupled to the second sense contact 154 of the main poly resistor 118. Provided here is a voltage (Vbe) at the base of the fourth BJT 119 with an emitter area of 1, to which is added the voltage (Vbe) of the second BJT 109 with an emitter area of 1. Added to these two voltages (Vbe (119), Vbe (109)) is a voltage proportional to the Vbe voltages of the third and fourth BJT transistors 111, 115 between the base of the first BJT 107 and the second BJT 109. The Vbe of the first BJT 107 is removed from base of the first BJT 107, having an emitter area of 9. A second Vbe of the fifth BJT 117 is also removed, where the emitter area is 9. The sub-bandgap voltage (Vsbg) of the main current reference resistor 118 is between the bases of the fifth and sixth BJTs 117, 119. In some embodiments, the voltage Vsbg is a double delta including Vbe of NPN transistors 107/109 and PNP transistors 119/117+delta between base of the NPN transistor.

The delta voltage (ΔVbe) between the Vbe of the first BJT 107 and the Vbe of the second BJT 109 is given by the following formula:

$$\Delta Vbe=(kT/q)\ln 9, \quad (3)$$

illustrated by the arrow identified as ΔVbe(111) in FIG. 2, where k is Boltzmann's constant, T is temperature, q is the magnitude of the carrier charge, and CR118 is the current ratio corresponding to the voltages of the voltage difference. Equation (4) can also be applied between the fifth and sixth BJTs 117, 119. Since ΔVbe is a voltage proportional to the absolute temperature (PTAT) in the resistor, which is added with a complimentary to absolutely temperature (CTAT) voltage, the sub-bandgap voltage (Vsbg) across the main resistor 118 as a zero temperature coefficient adjusted by the first poly transistor length L110 to second poly transistor length L110, or Lr/LR ratio. The sub-bandgap voltage (Vsbg) is the sum of both ΔVbe and Vbe2*r/R as illustrated in FIG. 2, where Vbe2 is the voltage across the length L112 of the second poly resistor 112 coupled between the base of the third BJT 111 and the base of the fourth BJT 112.

In this chain of voltages, the resistor force contacts 151, 152 are not taken into account because the sum of the voltages is attached to the sense contact terminals 153, 154 only. Accordingly, the current $I_{bg}$ across band-gap resistor 118 is independent of 1/f noise and lifetime drift due to the lack of contact effect with respect to the Kelvin contacts. The sense contact terminals 153, 154 have little or no effect because little or no DC current is drawn from the sense terminals 153, 154. Accordingly, since the corresponding sense contact is insignificant, the resistance contact has little or no effect on the sensor contacts compared to the main resistance contacts 151, 152.

Figure 4:
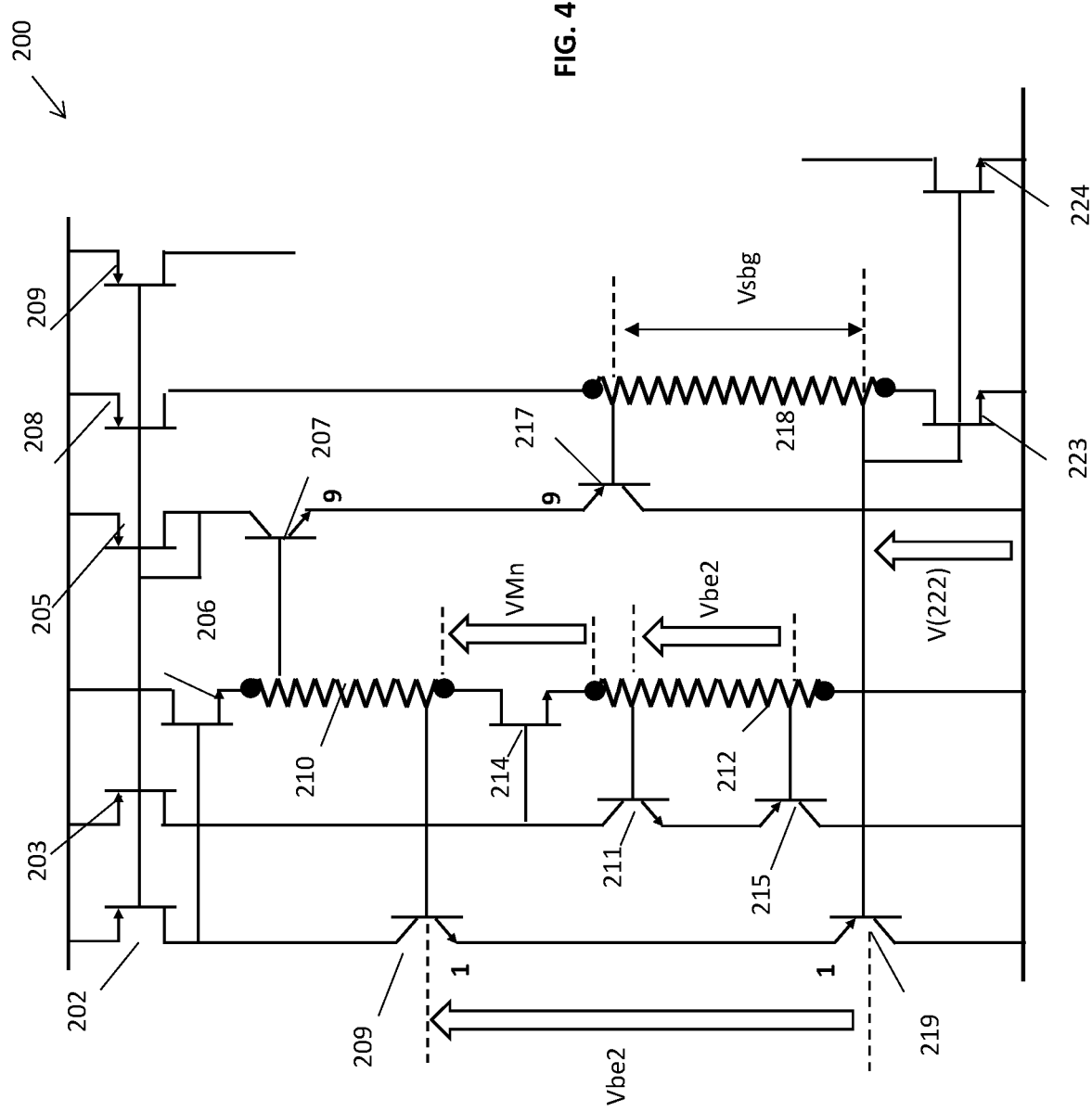
FIG. 4 is a schematic representation of a current reference circuit, in accordance with another embodiment.

FIG. 4 is a schematic representation of a current reference circuit 200 having a NMOS transistor 214 between poly resistors 210 and 212 and an NMOS transistor 223 coupled to the bottom connector 252 of the main resistor 218. Here, the base of a second BJT 209 is equal to the voltage across the second poly resistor 212 (Vbe (212))+the voltage across the second NMOS transistor 214 (VMn). The Vds of the second NMOS transistor 214 will have the same or similar voltage as the Vgs of the NMOS transistor 223. The additional NMOS transistor 223 can also be used to copy the current across the main resistor 218 to pull down the current reference in addition to the top PMOS copy current, e.g., at the drain of the top PMOS transistor 508, for example, copy transistor 260.

PMOS transistor 208 closes the loop to force the current in the resistor 218. PMOS transistors 202, 203, 209 and 205 provide copy currents. PMOS transistor 209, in particular, can be used to push the current reference to bias another in circuit. Transistor 224, on the other hand, can pull the reference current In fact, 202, 203, 205, 208 and 209 are the PMOS copy current, where 205 is the copy current input and all other are the outputs. 202, 203 and 208 are outputs copy current used for our own circuit, the 209 is used to provide current reference to other circuits.

A conventional circuit absent the NMOS 223 coupled to a bottom of the main bandgap resistor 218 would require the base of the p-type transistors 215, 219 to be connected to the ground voltage, whereby the base of the second BJT 209 would have the same voltage as the base of third BJT 211, resulting in little or no voltage across the Vds of the second NMOS transistor 214. The circuit 200 in FIG. 4 addresses this issue by including the NMOS 223 so that the base of the second BJT 209 is equal to the voltage across the second poly resistor 212 (Vbe2)+the voltage across the second NMOS transistor 214 (VMn).

Figure 5:
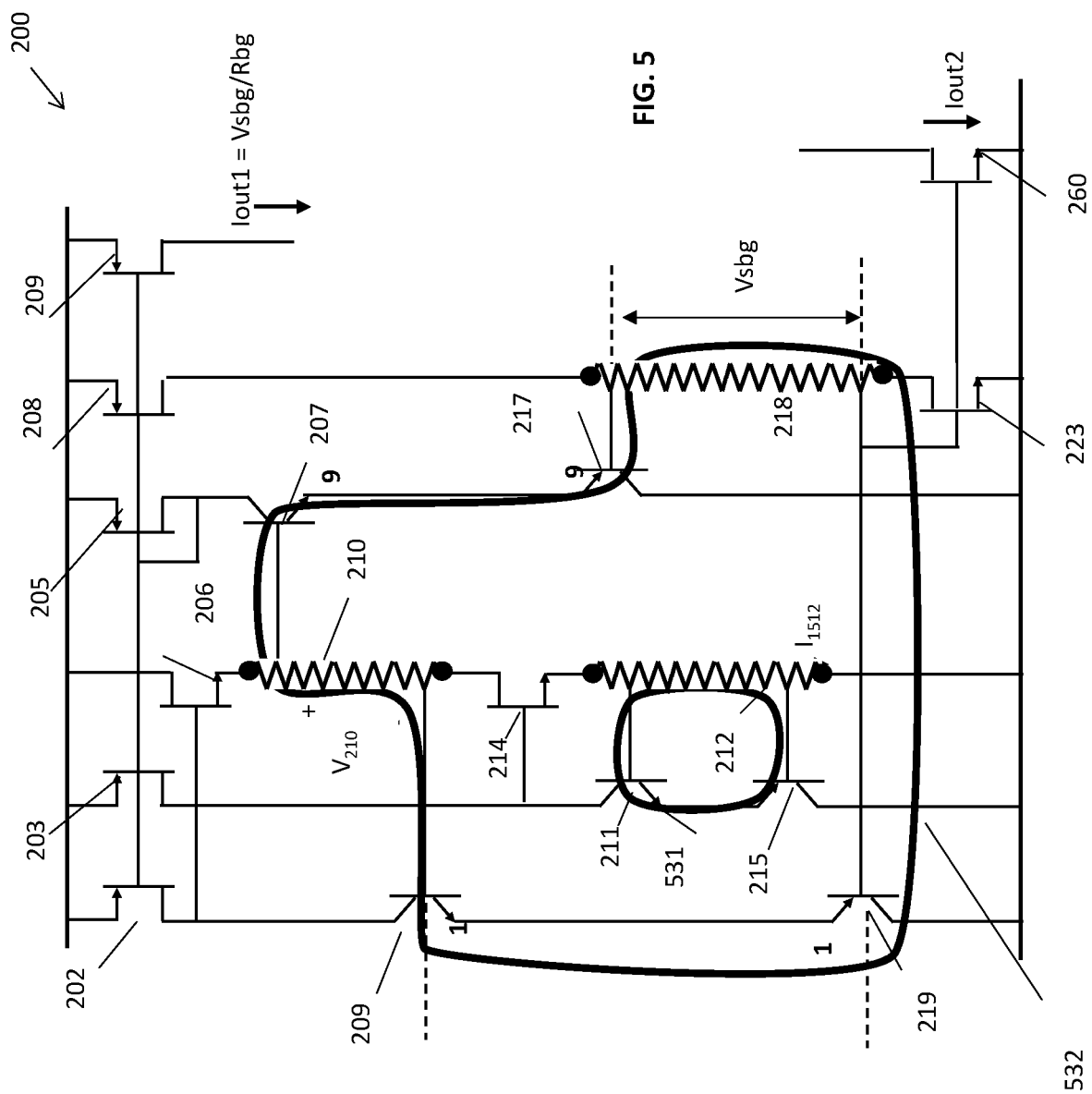
FIG. 5 is a schematic representation of the current reference circuit of FIG. 5A including an illustration of control loops about the circuit.

FIG. 5 is a schematic representation of the current reference circuit 200 of FIG. 4 including an illustration of control loops about the circuit 500.

A first control loop 531 establishes a CTAT current ($I_R$) according to equation (5):

$$I_R=(Vebp+Vben)/R, \quad (5)$$

where Vebp is the voltage across the emitter and base of the third BJT 511, Vben the voltage across the base and emitter of the fourth BJT 515, and R is the resistance across the second poly resistor 512.

In addition to the third BJT 511, fourth BJT 512, and second poly resistor 512, the first control loop 531 includes the second NMOS transistor 514.

The CTAT current ($I_R$) also flows through the first poly resistor 210, which creates a scaled CTAT voltage in a second control loop 532, which creates the sub-bandgap voltage:

The CTAT current ($I_R$) according to equation (6):

$$V_R=I_R*r=r/R*(Vebp+Vben) \quad (6)$$

The second control loop 532 creates the sub-bandgap voltage by summing $V_R$ (CTAT) with two PTAT voltages according to equation (7):

$$Vsbg=V_r+(Vben1-Vben9)+(Vbep1-Vbep9),$$

where $$Vr=V_R(r/R)=Vbe2*(r/R) \quad (7)$$

wherein Vben1 is the base-emitter voltage of the second BJT 109, Vben9 is the base-emitter voltage ($V_{be}$) of the first BJT 107, Vbep1 is the base-emitter voltage of the sixth BJT 119, and Vbep9 is the base-emitter voltage of the fifth BJT 109.

$$V_{sbg}=V_R+2*kT/q\,(\ln(9)), \quad (8)$$

where Vsbg is the sub-bandgap voltage across the main resistor 118, and ln(9) provides the area ratio of BJT (107)/BJT (109) and BJT (117)/BJT (119) provides the area noted 1 and 9 as closing the symbol emitter.

Here, the sub-bandgap voltage across the main resistor 118 is flat, or constant regardless of temperature variations due at least in part to the control loops 531, 532 not including any polysilicon contacts associated with the Kelvin force terminals 131, 132, 141, 142, 151, and 152. Accordingly, the second control loop 532 includes transistors 207, 209, 217, 219, and resistors 210 and 218.

Figure 6:
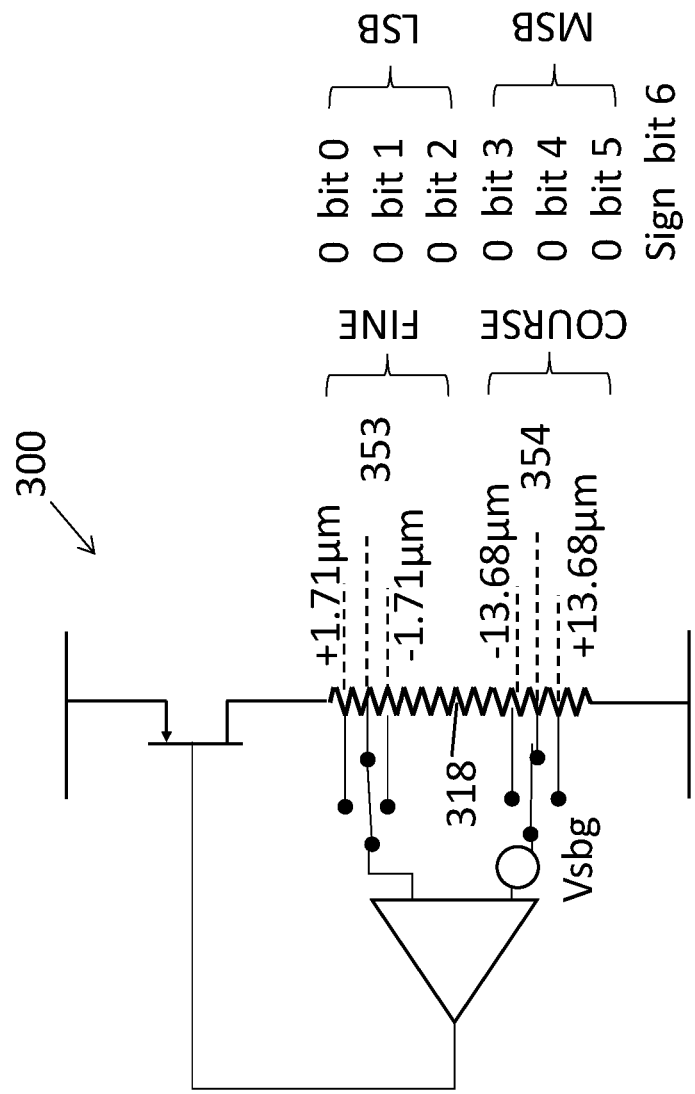
FIG. 6 is a schematic representation of a current reference circuit, in accordance with another embodiment.
Figure 7:
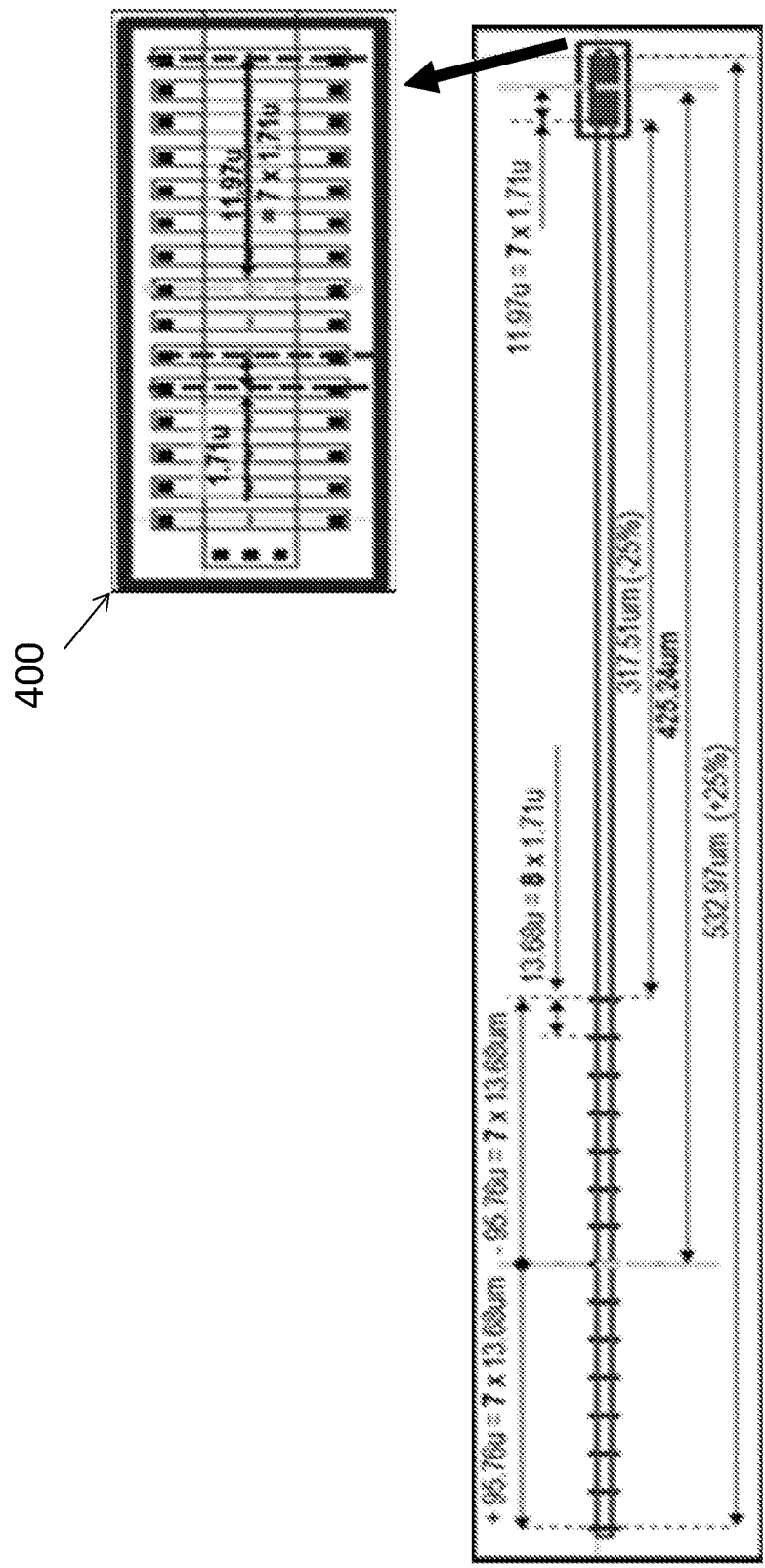
FIG. 7 is an illustration of a display for current adjustment by performing course and fine trim operations on a current reference circuit, in accordance with an embodiment.

FIG. 6 is a schematic representation of a current reference circuit 300, in accordance with another embodiment. FIG. 7 is an illustration of a display 400 for current adjustment by performing course and fine trim operations on the current reference circuit 300 of FIG. 6.

As shown in FIG. 6, a main ($R_{BG}$) resistor 318 of a current reference circuit 300 has two sensor contacts 353, 354, similar to or the same as the main resistor 118 of FIGS. 1 and 2 or the main resistor 218 of FIGS. 4 and 5. Here, a fine and/or course trim operation can be performed on the current reference circuit 300. For example, 3 LSB bits are provided for a fine trim operation, or more specifically, and 3 MSB bits are provided for a course trim operation.

In the example shown in FIG. 6, a minimum step of 1.71 µm over a 425 µm length of the resistor 318 will provide a minimum current variation of 0.4%. With a minimum step of 0.4%, the circuit 300 can have a +/−0.2% accuracy. With six bits providing 63 steps, the circuit 300 provide a 25% current adjustment. With an additional bit used for the sign, the circuit 300 can have a range of +/−25% with an accuracy of +/−0.2%.

Shown in the enlarged view is the fine trim formed by the three LSB bits. The sense contacts (white dots) are surrounded by polysilicon, and do not have any electrical communication with the main resistance portion of the resistor 618. Accordingly, the current reference is independent of the poly resistor contacts.

As will be appreciated, embodiments as disclosed include at least the following embodiments. In one embodiment, a current reference circuit comprises a main resistor, comprising: a first force contact terminal at a first end of the main resistor and coupled to a first metal-oxide-semiconductor (MOS) component; a second force contact terminal at a second end of the main resistor and coupled to a second MOS component; a first sense contact terminal coupled to one bipolar junction transistor (BJT); and a second sense contact terminal opposite the first sense contact by a length of the main resistor and coupled to another bipolar junction transistor, wherein the first and second sense contact terminals exchange a current reference independently of the first and second force contact terminals.

Alternative embodiments of the current reference circuit include one of the following features, or any combination thereof.

The current reference circuit further comprises a first poly resistor, comprising: a first force contact terminal coupled to a first NMOS transistor (106); a second force contact terminal coupled to a second NMOS transistor; a first sense contact terminal coupled to a first BJT; and a second sense contact terminal (coupled to a second BJT.

The second NMOS transistor is coupled between the first poly resistor and a second poly resistor to control a current loop so that a current across the first NMOS transistor is equal to a current across the second NMOS transistor, and a current across the first poly resistor is defined by a length between the first sense contact terminal and the second sense contact terminal of the first poly resistor.

The second poly resistor has a first sense contact coupled to a third BJT and a second contact coupled to a fourth BJT, and wherein a current across the second poly resistor is defined by a length between the first sense contact terminal and the second sense contact terminal of the second poly resistor.

The current reference circuit further comprises a control loop between the first and second sense contact terminals independent of the first and second force contact terminals for generating a sub-bandgap voltage across the main resistor.

The control loop includes a first poly resistor and a second poly resistor, and wherein the sub-bandgap voltage that has a temperature coefficient adjusted by a ratio of a length of the first poly resistor and a length of the second poly resistor.

The ratio does not depend on a contact effect, and that the second poly resistor is sensed with both the third BJT and the fourth BJT.

The sub-bandgap voltage is a sum of a delta voltage between a base voltage of the first BJT and a base voltage of the second BJT and a sum of a delta voltage between a base-emitter voltage of the other BJT and a base-emitter voltage of the one BJT and a voltage between the bases of the first BJT and the second BJT.

The current flowing through the first poly resistor and the second poly resistor has a same current value.

The current across the main resistor is independent of 1/f noise and lifetime drift due to little or no direct current drawn from the first and second sense contact terminals of the main resistor, and the resistance contact has little or no effect on the first and second sense contact terminals as distinguished from the first and second force contact terminals.

The current reference circuit further comprises a source transistor minimum supply voltage path from the first PMOS transistor to the second MOS component via the main resistor.

The first sense contact terminal and the second sense contact terminal for a sense circuit that provides a trim control feature to increase a trim accuracy of the current reference circuit by moving a position of at least one of the first sense contact terminal and the second sense contact terminal relative to a resistance region of the main resistor.

The second MOS component is coupled to the bottom connector of the main resistor forming a voltage which summed with a voltage across the second poly resistor equals a voltage at the base of the second BJT.

In another embodiment, a battery management system comprises a current reference circuit, comprising: a main resistor, comprising: a first force contact terminal at a first end of the main resistor and coupled to a first metal-oxide-semiconductor (MOS) component; a second force contact terminal at a second end of the main resistor and coupled to a second MOS component; a first sense contact terminal coupled to one bipolar junction transistor (BJT); and a second sense contact terminal opposite the first sense contact by a length of the main resistor and coupled to another bipolar junction transistor, wherein the first and second sense contact terminals exchange a current reference independently of the first and second force contact terminals.

Alternative embodiments of the battery management system include one of the following features, or any combination thereof.

The battery management system further comprises a first poly resistor comprising a first force contact terminal coupled to a first NMOS transistor; a second force contact terminal coupled to a second NMOS transistor; a first sense contact terminal coupled to a first BJT; and a second sense contact terminal coupled to a second BJT.

The second NMOS transistor is coupled between the first poly resistor and a second poly resistor to control a current loop so that a current across the first NMOS transistor is equal to a current across the second NMOS transistor, and a current across the first poly resistor is defined by a length between the first sense contact terminal and the second sense contact terminal of the first poly resistor.

The battery management system further comprises a control loop between the first and second sense contact terminals independent of the first and second force contact terminals for generating a sub-bandgap voltage across the main resistor.

In another embodiment, a current reference circuit comprises a main resistor, comprising: a first force contact terminal at a first end of the main resistor; a second force contact terminal at a second end of the main resistor; a first sense contact terminal coupled to one bipolar junction transistor (BJT); and a second sense contact terminal opposite the first sense contact by a length of the main resistor and coupled to another bipolar junction transistor. The circuit further comprises a resistor arrangement that provides a resistance ratio, comprising: a first poly resistor and a second poly resistor, each of the first and second poly resistors comprising: a first force contact terminal; a second force contact terminal; a first sense contact terminal; and a second sense contact terminal, wherein the current reference circuit generates a sub-bandgap voltage that has a temperature coefficient adjusted by a ratio of a length of the first poly resistor defined by the first and second contact terminals of the first poly resistor and a of the second poly resistor defined by the first and second contact terminals of the second poly resistor.

Alternative embodiments of the current reference circuit include one of the following features, or any combination thereof.

The current reference circuit further comprises a control loop between the first and second sense contact terminals independent of the first and second force contact terminals for generating a sub-bandgap voltage across the main resistor.

A current flowing through the first poly resistor and the second poly resistor has a same current value.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A current reference circuit, comprising:
   a main resistor comprising a poly resistor, the main resistor comprising:
   a first force contact terminal at a first end of the main resistor and coupled to a first metal-oxide-semiconductor (MOS) component;
   a second force contact terminal at a second end of the main resistor and coupled to a second MOS component;
   a first sense contact terminal coupled to one bipolar junction transistor (BJT);
   a second sense contact terminal opposite the first sense contact terminal by a length of the main resistor and coupled to another bipolar junction transistor, wherein the first and second sense contact terminals exchange a current reference independently of the first and second force contact terminals; and
   a resistor arrangement configured to provide a resistance ratio, the resistor arrangement including a first poly resistor and a second poly resistor.

2. The current reference circuit of claim 1, wherein the first poly resistor comprises:
   a first force contact terminal coupled to a first NMOS transistor;
   a second force contact terminal coupled to a second NMOS transistor;
   a first sense contact terminal coupled to a first BJT; and
   a second sense contact terminal coupled to a second BJT.

3. The current reference circuit of claim 2, wherein the second NMOS transistor is coupled between the first poly resistor and the second poly resistor to control a current loop so that a current across the first NMOS transistor is equal to a current across the second NMOS transistor, and a current across the first poly resistor is defined by a length between the first sense contact terminal and the second sense contact terminal of the first poly resistor.

4. The current reference circuit of claim 2, wherein the second poly resistor has a first sense contact coupled to a third BJT and a second contact coupled to a fourth BJT, and wherein a current across the second poly resistor is defined by a length between the first sense contact terminal and the second sense contact terminal of the second poly resistor.

5. The current reference circuit claim 4, further comprising a control loop between the first and second sense contact terminals independent of the first and second force contact terminals for generating a sub-bandgap voltage across the main resistor.

6. The current reference circuit of claim 5, wherein the control loop includes the first poly resistor and the second poly resistor, and wherein the sub-bandgap voltage that has a temperature coefficient adjusted by a ratio of a length of the first poly resistor and a length of the second poly resistor.

7. The current reference circuit of claim 6, wherein the ratio does not depend on a contact effect, and that the second poly resistor is sensed with both the third BJT and the fourth BJT.

8. The current reference circuit of claim 5, wherein the sub-bandgap voltage is a sum of a delta voltage between a base voltage of the first BJT and a base voltage of the second BJT and a sum of a delta voltage between a base-emitter voltage of the first BJT and a base-emitter voltage of the second BJT.

9. The current reference circuit of claim 1, wherein a current flowing through the first poly resistor and the second poly resistor has a same current value.

10. The current reference circuit of claim 1, wherein a current across the main resistor is independent of 1/f noise and lifetime drift due to little or no direct current drawn from the first and second sense contact terminals of the main resistor, and a resistance contact has little or no effect on the first and second sense contact terminals as distinguished from the first and second force contact terminals.

11. The current reference circuit of claim 2, further comprising a source transistor minimum supply voltage path from the first MOS component to the second MOS component via the main resistor.

12. The current reference circuit of claim 1, wherein the first sense contact terminal and the second sense contact terminal for a sense circuit that provides a trim control feature to increase a trim accuracy of the current reference circuit by moving a position of at least one of the first sense contact terminal and the second sense contact terminal relative to a resistance region of the main resistor.

13. The current reference circuit of claim 11, wherein the second MOS component is coupled to the bottom connector of the main resistor forming a voltage which summed with a voltage across the second poly resistor equals a voltage at the base of the second BJT.

14. A battery management system, comprising:
a current reference circuit, comprising:
a main resistor comprising a poly resistor, the main resistor comprising:
a first force contact terminal at a first end of the main resistor and coupled to a first metal-oxide-semiconductor (MOS) component;
a second force contact terminal at a second end of the main resistor and coupled to a second MOS component;
a first sense contact terminal coupled to one bipolar junction transistor (BJT); and
a second sense contact terminal opposite the first sense contact terminal by a length of the main resistor and coupled to another bipolar junction transistor, wherein the first and second sense contact terminals exchange a current reference independently of the first and second force contact terminals; and
a resistor arrangement configured to provide a resistance ratio, the resistor arrangement including a first poly resistor and a second poly resistor.

15. The battery management system of claim 14, wherein the first poly resistor comprises:
a first force contact terminal coupled to a first NMOS transistor;
a second force contact terminal coupled to a second NMOS transistor;
a first sense contact terminal coupled to a first BJT; and
a second sense contact terminal coupled to a second BJT.

16. The battery management system of claim 15, wherein the second NMOS transistor is coupled between the first poly resistor and a second poly resistor to control a current loop so that a current across the first NMOS transistor is equal to a current across the second NMOS transistor, and a current across the first poly resistor is defined by a length between the first sense contact terminal and the second sense contact terminal of the first poly resistor.

17. The battery management system of claim 14, further comprising a control loop between the first and second sense contact terminals independent of the first and second force contact terminals for generating a sub-bandgap voltage across the main resistor.

18. A current reference circuit, comprising:
a main resistor, comprising:
a first force contact terminal at a first end of the main resistor;
a second force contact terminal at a second end of the main resistor;
a first sense contact terminal coupled to one bipolar junction transistor (BJT); and
a second sense contact terminal opposite the first sense contact terminal by a length of the main resistor and coupled to another bipolar junction transistor; and
a resistor arrangement that provides a resistance ratio, comprising:
a first poly resistor and a second poly resistor, each of the first and second poly resistors comprising:
a first force contact terminal;
a second force contact terminal;
a first sense contact terminal; and
a second sense contact terminal, wherein the current reference circuit generates a sub-bandgap voltage that has a temperature coefficient adjusted by a ratio of a length of the first poly resistor defined by the first and second contact terminals of the first poly resistor and a length of the second poly resistor defined by the first and second contact terminals of the second poly resistor.

19. The current reference circuit of claim 17, further comprising a control loop between the first and second sense contact terminals independent of the first and second force contact terminals for generating a sub-bandgap voltage across the main resistor.

20. The current reference circuit of claim 17, wherein a current flowing through the first poly resistor and the second poly resistor has a same current value.

* * * * *